Patented Aug. 27, 1940

2,212,557

UNITED STATES PATENT OFFICE 2,212,557

COMPOSITION ADAPTED FOR USE AS AN ADHESIVE

Jordan V. Bauer, Chicago, Ill., assignor to Stein, Hall Manufacturing Company, Chicago, Ill., a corporation of Delaware No Drawing. Application August 17, 1936, Serial No. 96,525

7 Claims. (Cl. 134—23.4)

My invention relates to potential adhesive substances of the type which become effective and bonded to an applied surface upon being subjected to heat either during or subsequent to such application.

More particularly my invention relates to potential adhesives containing ungelatinized starch carried in a viscous water containing suspending medium, the combination being capable, upon being subjected to heat, to rapidly increase in viscosity and give an immediate bonding effect.

This application is in part a continuation of my application Serial No. 33,206, filed July 26, 1935, now Patent Number 2,102,937, and my application Serial No. 85,764, filed June 17, 1936, now Patent Number 2,051,025.

My potential adhesives are particularly suitable for use in processes for making corrugated paper board. In such processes I have found that the suspending medium for the ungelatinized starch should preferably be of a sufficient viscosity to retain the ungelatinized starch in a state of relatively uniform and permanent suspension so that an even application of the potential bonding agent is present along the corrugated tips or on the surface of a liner. In addition to maintaining a uniform suspension of the starch, the viscosity of the composition should preferably also be such as to allow the composition to retain substantially its form as applied without unnecessary absorption by the paper or running or smearing along the surface of the paper. The potential adhesive composition, however, should preferably be sufficiently fluid to allow it to be picked up and applied to the paper by means of rotating rolls. This is particularly important as the paper in modern corrugating operations travels at a relatively high speed and uniform and positive application of the potential adhesive must at all times be made.

It is further important that the suspending medium be capable of carrying sufficient water to permit the ungelatinized starch portion to become substantially completely gelatinized upon the application of heat and, further, to increase the covering effect of the composition for a given amount of starch and thus minimize the cost.

I have found that one of the most important factors in the successful use of ungelatinized starch as an adhesive which is gelatinized in situ, particularly in a corrugated paper operation, is the suspending medium or carrier and the balance between such carrier and the ungelatinized starch.

One of the objects of my invention is to provide a potential adhesive composition capable upon application of being converted to an effective bonding medium.

Another object of my invention is to provide in a potential adhesive composition a suspending medium or carrier for ungelatinized starch.

The balance between the ungelatinized starch and the carrier I have found is an important factor in the obtaining of a successful adhesive composition, particularly in connection with corrugated paper operations for not only is it desirable to maintain the starch in a relatively permanent and uniformly suspended condition, but the balance of ungelatinized starch to carrier, water content, inert material, and other substances which might be present for various purposes, must be effective to give the desired increase in viscosity and a resultant bonding action. Further, the bond must preferably be of sufficient strength to be substantially permanent. The action of the ungelatinized starch upon being gelatinized is apparently not merely one of becoming a highly viscous agent in itself upon the taking up of water, but the water removed from the carrier by the ungelatinized starch may cause such a modification of the characteristics of the carrier as to also render it into a condition whereby it has adhesive characteristics.

Although gelatinized starch is a suitable carrier, I have also found that certain non-amylaceous substances are also particularly suitable as carriers and have certain properties not found in gelatinized starch when used in my relationship with ungelatinized starch to form the potential adhesive adapted to be rendered effective by heat in situ. As examples of these non-amylaceous carriers which I have found give desirable potential adhesive compositions when used in proper proportions with ungelatinized starch are glutinous substances such as are found in wheat, rye, and other flours. In some cases, as I have subsequently described in greater detail, it is desirable to treat or modify the characteristics of the gluten somewhat but, in general, these substances are of particular importance in my invention because of the natural proportions of ungelatinized starch and glutinous carrier available in its natural state. I have described the use of this type of substance in greater detail later and have disclosed readjustment and rebalancing of the glutinous carriers of ungelatinized starch relationship by the use of addition agents.

Other non-amylaceous types of carrier substance for use in my potential adhesive composition as described are the inorganic hydrous or colloidal gels such as, for example, a natural hydrous silicate of alumina commonly referred to as bentonite; and various other hydrogels or hydrosols of silica, alumina, and magnesia might be used. Bentonite, for example, has the property of forming a colloidal gel or sol with as much as 20 to 30 times its weight of water.

Other such colloidal clays have somewhat similar properties. I have found that this general class of substances can act very effectively as carrier mediums for ungelatinized starch in my desired composition and can carry sufficient water to form a desired colloidal sol or gel. I have found also that they are particularly effective when used in conjunction with various vegetable types of carriers for I then secured the inherent advantages of both types of composition, that is, I obtained the advantage of the possible superior suspending properties of bentonite hydrosols, for example, and at the same time can obtain the superior viscosity and pickup characteristics of vegetable hydrosols or hydrogels. Thus, it is possible to produce relatively fluid compositions of my adhesive and yet substantially avoid settling out of the ungelatinized starch components. I have found that this type of carrier, using, for example, bentonite in conjunction with a vegetable hydrosol, is effective in reducing the degree of absorption of the adhesive by the paper particularly in connection with straw board which is known to be highly absorbent. The bentonite clay apparently acts to clog the pores of the paper and thus prevents undue absorption in addition to acting as a suspending medium.

Another advantage of a carrier combination of the type referred to above is that it permits the incorporation into the adhesive composition of relatively large amounts of inert filler materials, such as paper makers clay, yellow ochre, powdered talc, chalk and other similar substances. This tends to reduce the proportion of water to solids in the adhesive without seriously impairing its effective action as a bonding agent or its increase in cost. A low water to solids ratio is of advantage in connection with certain uses.

Another type of carrier substance suitable for use in my potential adhesive composition as described is the natural gums or vegetable gums such as locust bean gum, gum karaya, gum tragacanth, Irish moss and agar agar. These natural gums may be suitably prepared to give viscous carriers capable of retaining relatively large amounts of water which may be blended or mixed with other types of carriers, particularly inorganic carriers, such as the hydrous or colloidal gels of alumina, silica or magnesia. As already pointed out, such a combination permits the use of a carrier having the desirable properties of both. Animal and vegetable gelatins may also be used in these combinations.

I have set forth below several characteristic formulae for the purposes of illustrating the various potential adhesive compositions which I may use and in which are embodied the essential factors of my invention. These formulae, however, are not to be considered as limiting my invention but are for the purposes of illustration.

In general, in connection with each of these formulae I have discussed a function or theory or operation of the various ingredients present as such function is within my present understanding. However, such statements are not to be interpreted as limitations upon my invention.

A formula illustrating my adhesive composition utilizing a glutinous carrier in combination with an inorganic carrier is as follows:

Formula 1

A blend comprising—

|  | Per cent |
| --- | --- |
| White rye flour | 87 |
| Bentonite | 3 |
| Urea | 6 |
| Borax | 4 | is made and 100 lbs. of same is agitated with 300 lbs. of cold water. One lb. of phenol and 2 oz. of caprylic alcohol are added. The mixture is agitated until a smooth homogeneous fluid mixture is obtained. The adhesive is then ready for use in a corrugated paper process such as is described in my copending application Serial No. 85,764, filed June 17, 1936.

The proportions of the components of the formula suggested above are preferably so balanced that the gluten content of the rye flour in conjunction with the bentonite form with water a hydrosol of such viscosity as to carry the ungelatinized starch particles of the rye flour into a state of uniform and relatively permanent suspension.

In addition to the adhesive being sufficiently viscous so that the ungelatinized starch components can be held in a state of relatively uniform and permanent suspension, it is important that the potential adhesive be sufficiently fluid to enable it to be picked up and applied to the paper by means of a rotating application roll. In addition, sufficient water should be present to obtain a desired amount of spread or covering with the potential adhesive and, further sufficient water should be present to permit the ungelatinized starch to become at least substantially completely gelatinized. However, the composition as applied should remain in place as applied without material absorption or spreading.

I have found that these characteristics which are desirable in my potential adhesive or its carrier cannot be fully and fairly expressed merely in terms of viscosity. However, a practical and empirical method of indicating the viscosity of my potential adhesive or the carrier has been developed for certain comparative purposes. A metal tube approximately 5⅞" long is fitted with two marks spaced about 3¾" and 5½" respectively from the bottom of the tube and so adjusted that the volume between the marks is 100 cc. The bottom of the tube is fitted with a pierced plate and is so calibrated that it will pass 100 cc. of water in 15 seconds as indicated by the two marks. One hundred cc. of my potential adhesive at 75° F. should pass through the viscosity meter in from 20 to 100 seconds with a preferred viscosity of from about 22 to 27 seconds. It is possible, however, by proper balancing of the ingredients of my composition to obtain a product which will have a viscosity, as determined above, of about 15½ seconds and yet which will stand on the corrugated tips.

The urea in the above formula acts to lower the temperature at which the rye starch will gelatinize upon being subjected to heat in a heating zone. Thus, the composition is rendered effective as a bonding agent at a lower temperature. Also, in view of a lowering of the gelatinization temperature, the contiguous plies may be passed through the machine more rapidly for a given temperature in a heating zone.

In addition to urea, other known gelatinizing agents may be used, for example, caustic soda, zinc chloride, formaldehyde, sodium acetate, resorcinol or ammonium sulphocyanide.

The natural gelatinization temperature of starches of different origin varies considerably and is raised considerably by the presence of soluble materials such as borax, certain salts, soluble dextrins, sugars, etc., therefore the proportion of starch gelatinizing agent used to effectively lower the gelatinization temperature must be such that these factors are compensated for. The gelatinization temperature of certain starches should be lowered in order to obtain a preferred operation with them on the usual commercial form of corrugating machine; for example, the starches so treated, preferable for present day operations, should not gelatinize at a temperature lower than 120° F. for gelatinization in storage tanks and gum boxes or application tanks is to be avoided. Gelatinization temperatures should preferably be not higher than 200° F. in view of present-day high speed operations in which heating facilities may be limited. The preferred ranges are between 140° and 160° F.

The control of gelatinization temperature is an important feature in my development for by it I am able to use all types of starches notwithstanding their natural gelatinization temperatures and make possible a uniform operation. Furthermore, I am able to use such starches in various combinations and adapt them to use in commercial operations in which the temperatures available are not uniform. This can all be accomplished by controlling the gelatinization point of ungelatinized starch so that it will not become gelatinized until it reaches a certain temperature in situ and which when it reaches such temperature will become effective. This is accomplished by a suitable preliminary treatment with gelatinization agents of the type, for example, indicated above.

The usual temperatures reached by the paper and adhesive during passage through the heating zones of a corrugating process probably range between 165 to 180° F. The heating surfaces on the single facer range, for example, between 280 and 375° F. and the heating surfaces on the double facer, that is on the plates, range between 280 and 335° F. In making corrugated paper the temperatures reached by the paper, of course, are dependent upon the type of material used and its rate of passage through the heating zones.

Borax is used in the above formula primarily to raise the degree of viscosity developed by the rye starch at the moment of its gelatinization in situ during the heating step. This rapid increase in viscosity facilitates the formation of an immediate effective bond and, further, enables the use of relatively large amounts of water in a given formula. Other substances which may be considered as equivalents in this connection, in addition to borax, are other soluble borates and soluble aluminates such as sodium aluminate. Sodium monoborate and related compounds may also be used.

Borax tends to increase the suddenness or speed of gelatinization and, in addition, has a tendency to raise the gelatinization temperature. However, this can be compensated for by adding a gelatinizing agent for lowering the gelatinization temperature, as already described. In this connection the monoborate appears to have less tendency to raise the gelatinization temperature. I have found that these agents for increasing the viscosity upon gelatinization in situ may be successfully used in amounts as high as 10% of the weight of the starch or higher and 0.1% has also been found to have in some cases a desirable effect.

The capryl alcohol utilized in Formula 1 acts as an anti-foaming agent. Formulae utilizing glutinous flours are somewhat susceptible to foaming, the fiber present apparently being a contributing factor. Various other anti-foaming agents would be other of the higher alcohols, for example, amyl, butyl, and hexyl.

The phenol is added for the purpose of preserving the composition against deterioration. Other known preservatives may be used.

The bentonite as already pointed out above acts to keep the ungelatinized starch and any additional fillers in relatively uniform and permanent suspension. Settling in the storage tanks and gum boxes from which the composition is transferred directly to the paper is avoided. The bentonite also has the property of preventing undue absorption of the composition by the paper. However, the bentonite does not prevent the necessary wetting of the paper by the adhesive. Bentonite, in addition, is also found to inhibit the breaking down of the viscosity of the composition, such as might take place as a result of long continued circulation of the composition through the mixing and applying apparatus prior to application to the paper.

Rye flour varies somewhat in characteristics and various grades are known to the trade. It may be necessary, therefore, to vary the proportions of water slightly in the above formula to obtain an adhesive having desirable fluid characteristics for a given operation. The adhesive, as prepared in Formula 1 above, would have a gelatinization temperature of about 143° F. and is of a free flowing nature when applied to the paper. Upon passing through a heating zone in which it is subjected to a temperature greater than 143° F., it becomes gelatinized in situ forming a tough, rubbery gel having immediate effective bonding characteristics.

*Formula 2*

| A blend comprising— | Per cent |
|---|---|
| Wheat flour | 95 |
| Sodium bisulphite | 1 |
| Borax | 4 | is made and 100 lbs. of such a blend is agitated with 225 lbs. of water in which has been dissolved 1 lb. 3 oz. caustic soda. One lb. phenol and 2 oz. capryl alcohol are added. This composition is agitated until a smooth homogeneous fluid mixture is obtained. The potential adhesive is then ready for use.

The components of the above Formula 2 are so selected and balanced that the gluten content of the wheat flour forms with the sodium bisulphite and the water a hydrosol of sufficient viscosity to carry the starch component of the flour in a state of uniform suspension.

The sodium bisulphite acts upon the glutinous components as a liquefying agent to increase its fluidity. The effect of these sulphites is to modify the gluten and avoid a doughy formation. This assists in obtaining a smooth application of the composition to the paper. Various other agents of the type of sodium bisulphite may be used, such as sodium sulphite, sulphur dioxide, sulphurous acid, sodium hydrosulphite or other water soluble related sulphite salts such as, for example, the potassium salts. From 0.1% to 2% of these agents may be used although from ½ to 1% appears to be effective for my purposes.

It is preferred to operate with sufficient amounts of water to obtain a hydrosol phase although if no sulphite modifying agents are used and only 2 parts or less of water is used, a hydrogel would result. Wheat flour does not tend to develop the viscosity upon gelatinization that rye flour does so that less water is used, for example, 1½ to 3 parts of water, when a gluten modifying agent is utilized, or from 2 to 4 parts of water when no gluten modifying agent is utilized.

The caustic soda is utilized in this formula for the same purpose discussed above in connection with Formula 1. The natural gelatinization temperatures of wheat flour may range from 150° to 190° F. and it may be desirable to treat it with an agent for lowering the gelatinization to 140° F. or lower. The adhesive as prepared in the above Formula 2 would have a gelatinization temperature of about 145° F. Wheat starch normally has a higher gelatinization temperature than rye so that as a general rule, slightly more caustic, for example, would be used.

The borax functions in the same manner as described in connection with Formula 1 to raise the degree of viscosity developed by the wheat starch at its moment of gelatinization in situ during the heating step.

The phenol and capryl alcohol also function in the same manner as described in connection with Formula 1.

Various grades of flours have a different gluten content and it may be necessary to vary the proportion of water slightly to obtain an adhesive of desirable fluid consistency when using wheat flour or other flours. The natural flour products have inherently a balance between starch and other components capable of acting as carriers which is generally suitable for my purposes particularly when modified as already disclosed. However, if the carrier components, such as the gluten content, are low, additional carriers may be added such as gluten, gelatinized starch, natural gums or inorganic flocculent carriers of the type of bentonite. These additional carriers complement the natural carrier and, in addition, permit the obtaining of a desired viscosity and effective water concentration and permit the obtaining in the composition of certain desirable characteristics not present in the single natural substance.

Formula 3

A blend comprising—

| | |
|---|---|
| Cornstarch | 55 lbs. |
| Bentonite | 2 lbs. 8 oz. |
| Borax | 1 lb. 12 oz. | is made and thoroughly mixed with 100 lbs. of water. The carrier portion is prepared by dissolving 1 lb. 8 oz. caustic soda in 100 lbs. of water and then mixing 1 lb. locust bean gum with the water and agitating until it is completely dispersed. The two liquid mixtures are then combined and agitated until a smooth homogeneous flour mixture is obtained which is then ready for use as an adhesive.

The locust bean gum and the bentonite form with the water component a sufficiently viscous hydrosol carrier medium to suspend the ungelatinized components in a relatively uniform and permanent state. It also carries sufficient water to facilitate application and coverage over a relatively large area.

The caustic soda functions as already described to lower the gelatinization temperature of the starch.

The borax acts to increase the viscosity of the starch at the moment of its gelatinization in situ upon the application of heat in a corrugating process, for example.

The adhesive as prepared has a gelatinization temperature of about 145° F. and is of a free flowing nature when applied to a surface but upon being subjected to heating it sets up to a tough rubbery gel with an immediate bonding effect.

Formula 4

A blend comprising—

| | Per cent |
|---|---|
| Cornstarch | 88.5 |
| Calcium hydrate | 4.5 |
| Soda ash | 6.0 |
| Barium peroxide | 1.0 | is made and 35 lbs. of such a blend is dispersed in 140 lbs. of cold water. To this mixture is added 5 lbs. of caustic soda dissolved in 10 lbs. of water. The starch present in the mixture becomes gelatinized and the mixture is agitated for about 20 minutes, during which time it is thinned by the action of the barium peroxide until a smooth fluid consistency results. One pint of formaldehyde is then added to stop further action of the barium peroxide and the mixture is diluted with an additional 140 lbs. of water.

The ungelatinized potential adhesive base portion is made up as follows:

| | | |
|---|---|---|
| Cornstarch | lbs | 100 |
| Bentonite | lbs | 7 |
| Borax | lbs | 5½ |
| Water | lbs | 450 |
| Sulphonated oil | lb | 1 |

This mixture is then combined with the gelatinized starch mixture described above and the final composition agitated for about 30 minutes, after which it is ready for use. It will be noted that in this formula the modified gelatinized cornstarch, bentonite and water component function as the suspension of carrier medium for the ungelatinized starch. The adhesive as prepared by the above formula has a gelatinization temperature of about 143° F. It is of a fluid nature when applied to the paper but upon being subjected to the heating step, sets up to a tough rubbery gel with an immediate bonding effect.

The various ingredients disclosed in previous formulae perform substantially the same functions as the present formula.

The sulphonated oil disclosed in Formula 4 acts to increase the wetting effect of the adhesive when applied to the paper or other surface and thus facilitates its application. Also the smoothness of the pickup by the application rolls of the adhesive as well as its transfer to the paper is facilitated. These characteristics are more particularly important in connection with operations of relatively high speed corrugating machines. In addition, the sulphonated oil apparently assists the carrier in keeping the starch in suspension. Various substances may be used for this purpose such as sulphonated castor oil or turkey red oil, as well as any of the other water soluble sulphonated oils. Sodium lactate or wetting agents, such as sulphonated alcohols, or soap, or sulphonated fatty substances, such as sulphonated tallow, may be used, the latter, if necessary, with a solvent. These agents may be used if desired in the other formulae, for example, with the wheat or the rye flour. Generally, they are used in proportions of about .01 to 1% of sulphonated castor oil. I have found that 1 gal. of wetting agent to 1000 gals. of my composition as ready for use on the corrugating machine, is satisfactory. These wetting agents, in addition, have characteristics which may be helpful as defoaming agents.

*Formula 5*

A blend of—

| | |
|---|---|
| Tapioca flour lbs | 100 |
| Bentonite lbs | 2½ |
| Borax lbs | 4 |
| Domestic kaolin lbs | 100 | is mixed with 352 lbs. of water. In a separate container 70 lbs. of British gum, for example, a low soluble corn dextrin, is dispersed in 130 lbs. of cold water. To this mixture is added 6 lbs. of caustic soda dissolved in 15 lbs. of water. After the ungelatinized portion of the British gum becomes gelatinized and the mixture agitated for 20 minutes, ½ pint of formaldehyde (40% solution) is added. The two blends are then combined and agitated for about 30 minutes after which the potential adhesive composition is ready for use.

The above Formula 5 is an example of an adhesive with a low water to solids ratio. As prepared it has a gelatinization temperature of about 142° F. and a fluid consistency when applied to the surface to be bonded. However, after being subjected to heat, the adhesive sets up to a tough rubbery gel with an immediate bonding effect.

*Formula 6*

The following blend is made:

| | |
|---|---|
| Tapioca flour lbs | 85 |
| Bentonite lbs | 15 |

This blend is mixed with 200 lbs. of water and agitated until a smooth homogeneous mixture is obtained. The resultant adhesive is then ready for use. In a formula of this type the slurry of the bentonite and water acts as a medium to carry the ungelatinized tapioca flour in a state of relatively uniform suspension. The adhesive as prepared has a gelatinization temperature of about 155° F. and as applied to paper is in the form of a fluid slurry. Upon being subjected to heat, the potential adhesive is converted to a viscous tacky gel which gives an immediate bonding action. The tapioca flour has inherently a relatively low gelatinization temperature and this formula is of particular value when a non-alkaline adhesive for alkaline sensitive papers are required. If such a requirement need not be met, it is possible to use any of the available starches and treat them preliminarily to lower their gelatinization temperatures to a desired degree.

Corn flour may be used if properly blended with satisfactory carrier mediums for the natural gluten content of corn flour is not sufficient to act as a carrier and, further, I have found that it is not of a type suitable for such use as corn gluten appears to have no suspending characteristics. However, additional suspending glutinous carriers may be added or bentonite may be used, for example, and a satisfactory formula developed in view of the disclosures of formulae which I have indicated above. Rice flour, barley flour and oatmeal flour are somewhat similar to corn flour in this respect but can be used in combination with bentonite, for example, in the light of the illustrative proportions of the formulae given above.

It is also possible to use a formula of approximately 90% rye flour and 10% monoborate with 3 to 4 parts of water to 1 part of dry material. If it is desired to lower the gelatinization temperature of this mixture to approximately 135° F., only 9% of the sodium monoborate can be used and 1% caustic soda on the dry basis. The caustic soda acts as an agent for lowering the gelatinizing temperature. Rye gluten has natural characteristics which makes unnecessary the use of a gluten modifying agent unless certain specific characteristics are desired.

Another possible formula which I have used is composed of 50% rye flour and 50% K grade tapioca with 2 parts of water to 1 part of the blend on a dry basis. It will also be possible to use 100% rye flour with from 3 to 5 parts of water.

In preparing my potential adhesive compositions a sufficient amount of ungelatinized starch should be present in some form such that with the proportion of water used it will become gelatinized in situ upon the application of heat to give a useful and immediate bonding effect as a result of such gelatinization rather than as a result of the mere evaporation or absorption of water from the adhesive. I have found, for example, that a satisfactory adhesive can be developed containing as little as 15% of ungelatinized starch and as much as 85% of carrier material on a dry basis if the amount of water used in the formula is limited to something less than about 2½ parts of water to 1 part totally dry material.

In other words, the amount of ungelatinized starch may be as little as 4.28% of the total composition, or on the basis of the total amount of water used, as little as 3 parts of ungelatinized starch to 50 parts of water. In general, the smallest proportion of ungelatinized starch that can be used in an adhesive composition of this type is that amount which upon complete gelatinization after being subjected to heat in the fabricating machine will give an unusual increase in viscosity resulting in an immediate bonding action. The greatest proportion of ungelatinized starch that can be used in my adhesive composition is determined by the amount of water used in the formula and by the amount of carrier material necessary to give the finished composition a sufficient viscosity and other water holding wetting characteristics to operate successfully on the machine, thus taking into consideration all of the factors of my adhesive previously and subsequently enumerated. I have found that it is possible to use as low as 1¼ parts of water to 1 part of total dry material used, and I have also prepared potential adhesives containing as high as 7 parts of water to 1 part of total solids of ungelatinized starch and carrier.

In view of the fact that these adhesives may be used on commercial forms of corrugating machines previously operating with silicate of soda, it may be desirable to adjust the viscosity characteristic of the adhesive to one approaching or similar to a viscosity of 38° to 40° Bé. silicate of soda.

The adhesive, which I use as the bonding agent for my laminated products, differs from silicate of soda or a gelatinized type of starch adhesive in its bonding function. In my laminating operations, using this adhesive, the time required to form an adhesive bond between two pieces of paper under conditions wherein heat and light contact pressure are applied, is for the most part independent of the rate at which the moisture in the adhesive is driven off by heat or absorbed by the paper. Rather it is mainly the time required to heat the paper and adhesive to the gelatinization temperature of the suspended ungelatinized starch. Water is taken up by the starch as the starch gelatinizes and the viscosity of the adhesive mixture is raised to such an extent that an immediate bond is formed. Because of the great extent to which the viscosity can be increased by this method, I may use from three to seven parts of water to one part of dry material in my type of adhesive and still obtain a sufficient viscosity increase upon the application of heat to bond the paper satisfactorily when it comes off the machine.

The principal factors that determine the suitability of a starch for the ungelatinized starch portion of the bonding agent used in the laminated products of my present invention are as follows:

1. The time required to completely gelatinize the starch in water by means of heat.
2. The temperature at which the starch gelatinizes.
3. The viscosity developed by the starch after gelatinization.
4. The degree of tackiness developed after gelatinization.

It is desirable that the starch component of the bonding agent used in my laminated products gelatinize very rapidly so that it will develop a high degree of viscosity in a short length of time. This factor will determine the rate of speed at which the paper can be bonded on the machine.

It is desirable that this starch have a fairly low temperature of gelatinization in order that it will be within the temperature range developed on the machine. This factor will also determine the speed at which the paper can be bonded on the machine.

It is desirable that this starch develop a high degree of viscosity on gelatinizing because this factor will largely determine the amount of water that can be used in the adhesive formula. The greater the viscosity developed, the larger the amount of water that may be used, which will reduce the cost. Also, the greater the viscosity, the greater the strength of the bond which holds the paper together when it comes off the machine. The balance between these factors depends on the type of operation and type of laminated product desired by the user.

It is desirable that the starch upon gelatinization form a tacky or sticky gel as this tends to insure against breakage of the newly formed bond when the board is handled soon after coming off of the machine.

In regard to the portion of my adhesive which forms the carrier or suspension medium for the ungelatinized starch portion, it is desirable that this material be of such a nature that it may be prepared with water to form a free flowing solution or colloidal solution of sufficient viscosity to hold the granules of ungelatinized starch in suspension, and also enable the adhesive to be picked up by the rolls of the machine and applied to the paper.

The more essential features desired in a carrier for my purpose are as follows:

1. It should hold the ungelatinized starch portion of the adhesive in a state of suspension and thus prevent any undue separation or settling out of the ungelatinized starch granules.
2. It should pick up evenly and well on the smooth rolls of a corrugating machine, for example, and act as a medium for transferring the adhesive to the paper to be bonded.
3. It should be of sufficient viscosity to enable the adhesive to stand up on the surface of the paper after it has been applied and yet it should be of such a nature that it will effectively wet the paper surfaces to be bonded.
4. It should not foam in the glue boxes of the machine.
5. It should be capable of imparting sufficient viscosity to the adhesive to enable it to function properly even when, for example, from 1½ to 7 parts of water are used.

The use of the terms ungelatinized starch or ungelatinized amylaceous material I intend to include all substances containing such ungelatinized starchy components capable of taking up water upon being subjected to heat, irrespective of any preliminary treatment such as partial gelatinization or conversion. It is only necessary that there be such a proportion of ungelatinized starchy components present in my potential adhesive as to provide the necessary effective increase in viscosity upon the application of heat in situ to form an effective bond. For example, certain ungelatinized starch gums might ordinarily be considered as a converted material. However, the ungelatinized starchy components present in such gums are available and effective to give the desired bonding action in situ as described in this specification.

These potential adhesives may be used in corrugated paper processes having a heating stage, or in any coating, sizing or filling operation for sheet materials such as paper, fiber board, cloth and the like, in which heat may be made available to effect gelatinization in situ.

I have indicated above the characteristics desired in my carrier. I have found that certain natural substances such as flours contain the desired proportions of starch and carrier medium and that such carrier remains as the glutinous substances can be easily modified and become complemented to give desirable potential adhesive compositions. These substances are low in cost for my use as no prior separations are necessary. The other non-amylaceous carriers disclosed have certain desirable characteristics as already pointed out either when used alone or in combination with other carrier substances, such as gelatinized starch. These formulae which I have set forth herein are for the purposes of illustration only and various modifications may be made in the proportions, combinations, or in the blending operations without departing from the spirit of my invention. I, therefore, wish to be limited only by the prior art and the appended claims.

I claim:

1. A potential adhesive composition adapted for use as a bonding agent upon being subjected to heat in situ, comprising ungelatinized starch as the predominant binding agent carried in a state of relatively uniform and permanent suspension by a viscous aqueous non-amylaceous hydrosol carrier selected from the group consisting of the hydrosols of silica, alumina and magnesia, said ungelatinized starch having the property of gelatinizing and taking up water from the viscous carrier upon the application of heat, the amount of aqueous component present in said carrier being in such proportion to said ungelatinized starch as to be sufficient to allow said ungelatinized starch to be at least substantially completely gelatinized upon the application of heat in situ, and further said aqueous component being present in such a small proportion in said carrier that the amount taken up upon gelatinization in situ of said ungelatinized starch will cause an effective and immediate increase in viscosity of said potential adhesive composition, said proportions of aqueous component ranging from approximately 1½ to 7 parts thereof to 1 part of total solids, ungelatinized starch comprising at least 4.28% of the total composition, said composition having a viscosity of the nature indicated by the passage through a tube, calibrated to permit the flow of 100 cc. of water in 15 seconds at 75° F., of approximately 100 cc. of said composition in from 15½ to 100 seconds at 75° F., as described herein.

2. A potential adhesive composition for use as a bonding agent in the fabrication of corrugated paper board where the paper structure is subjected to a heating step exceeding a temperature of 140° F. during the course of fabrication, comprising at least 4.28% of ungelatinized starch and containing not more than 50 parts of water to 3 parts of ungelatinized starch by weight, the said ungelatinized starch being suspended in a natural gum hydrosol selected from the group consisting of locust bean gum, the gums karaya and tragacanth, Irish moss and agar-agar, said suspending material being in the proportion of not more than 17 parts of suspending material on a dry basis to 3 parts of ungelatinized starch, said potential adhesive composition having at least 1½ parts of water to 1 part of total dry materials used, said suspending medium being present in sufficient proportion to impart to the potential adhesive composition a viscosity of the nature indicated by the passage through a tube, calibrated to permit the flow of 100 cc. of water in 15 seconds at 75° F., of approximately 100 cc. of said potential adhesive composition in from 15½ to 100 seconds at 75° F., as described herein.

3. A potential adhesive composition for the purpose of fabricating corrugated paper wherein the paper structure is subjected to a heating step exceeding 140° F. during the course of fabrication, comprising at least 4.28% of ungelatinized starch and containing not more than 50 parts of water by weight to 3 parts by weight of ungelatinized starch, the said ungelatinized starch being suspended in a viscous hydrosol comprising gluten, said potential adhesive composition having added thereto an alkali in sufficient amount to lower the temperature of gelatinization of the ungelatinized starch, but insufficient in amount to gelatinize the ungelatinized starch at ordinary temperatures, the said glutinous suspending medium being in the proportion of not more than 17 parts of suspending medium to 3 parts of ungelatinized starch on a dry basis, said potential adhesive composition having at least 1½ parts of water to one part of total dry materials used, said suspending medium being present in sufficient proportion to impart to the potential adhesive composition a viscosity of the nature indicated by the passage through a tube, calibrated to permit the flow of 100 cc. of water in 15 seconds at 75° F., of approximately 100 cc. of said potential adhesive composition in from 15½ to 100 seconds at 75° F., as described herein.

4. A potential adhesive composition for use as a bonding agent in the fabrication of corrugated paper board where the paper structure is subjected to heat during the course of fabrication, comprising at least 4.38% of ungelatinized starch and containing not more than 50 parts of water to 3 parts by weight of ungelatinized starch, the said ungelatinized starch being suspended in a viscous hydrosol comprising gluten, the said potential adhesive composition having added thereto a substance from the class consisting of water soluble borates and sodium aluminate in sufficient amount to increase the degree of viscosity developed upon gelatinization of the ungelatinized starch to accelerate formation of the adhesive bond, the said glutinous suspending medium being in the proportion of not more than 17 parts of suspending medium to 3 parts of ungelatinized starch on a dry basis, the said potential adhesive composition having at least 1½ parts of water to one part of total dry materials used, the suspending medium being in such proportion to the water content of the potential adhesive composition as to impart thereto a viscosity of the nature indicated by the passage through a tube, calibrated to permit the flow of 100 cc. of water in 15 seconds at 75° F., of approximately 100 cc. of said potential adhesive composition in from 15½ to 100 seconds at 75° F., as disclosed herein.

5. A potential adhesive composition for use as a bonding agent in the fabrication of corrugated paper board where the paper structure is subjected to heat during the course of fabrication, comprising at least 4.38% of ungelatinized starch and containing not more than 50 parts of water to 3 parts of ungelatinized starch by weight, the said ungelatinized starch being suspended in a non-amylaceous, viscous, gelatinous hydrosol, said suspension medium being in the proportion of not more than 17 parts of suspending material to 3 parts of ungelatinized starch on a dry basis, said composition having at least 1½ parts of water to 1 part of total dry material used, said suspending medium being present in sufficient proportion to impart to the potential adhesive composition a viscosity of the nature indicated by the passage through a tube, calibrated to permit the flow of 100 cc. of water in 15 seconds at 75° F., of approximately 100 cc. of said potential adhesive composition in from 15½ to 100 seconds at 75° F., as disclosed herein.

6. A potential adhesive composition for use as a bonding agent in the fabrication of corrugated paper board where the paper structure is subjected to heat during the course of fabrication, comprising at least 4.38% of ungelatinized starch and containing not more than 50 parts of water to 3 parts of ungelatinized starch by weight, the said ungelatinized starch being suspended in a non-amylaceous, viscous, gelatinous hydrosol, the said potential adhesive composition having added thereto a substance from the class consisting of water soluble borates and sodium aluminate in sufficient amount to increase the degree of viscosity developed upon gelatinization of the ungelatinized starch to accelerate formation of the adhesive bond, the said suspension medium being in the proportion of not more than 17 parts of suspending material to 3 parts of ungelatinized starch on a dry basis, said composition having at least 1½ parts of water to 1 part of total dry material used, said suspending medium being present in sufficient proportion to impart to the potential adhesive composition a viscosity of the nature indicated by the passage through a tube, calibrated to permit the flow of 100 cc. of water in 15 seconds at 75° F., of approximately 100 cc. of said potential adhesive composition in from 15½ to 100 seconds at 75° F., as disclosed herein.

7. A potential adhesive composition for use as a bonding agent in the fabrication of corrugated paper board where the paper structure is subjected to heat during the course of fabrication, comprising at least 4.38% of ungelatinized starch and containing not more than 50 parts of water to 3 parts of ungelatinized starch by weight, the said ungelatinized starch being suspended in a non-amylaceous, viscous, gelatinous hydrosol, the said potential adhesive composition having added thereto a starch gelatinizing agent in an insufficient amount to gelatinize said ungelatinized starch at room temperatures, but in sufficient amount to lower the temperature of gelatinization upon subjection to heat above room temperatures, the said suspension medium being present in the proportion of not more than 17 parts of suspending material to 3 parts of ungelatinized starch on a dry basis, said composition having at least 1½ parts of water to 1 part of total dry material used, said suspending medium being present in sufficient proportion to impart to the potential adhesive composition a viscosity of the nature indicated by the passage through a tube, calibrated to permit the flow of 100 cc. of water in 15 seconds at 75° F., of approximately 100 cc. of said potential adhesive composition in from 15½ to 100 seconds at 75° F., as disclosed herein.

JORDAN V. BAUER.